W. A. Wood.
Harvester Cutter
No 15203
Patented June 24, 1856.
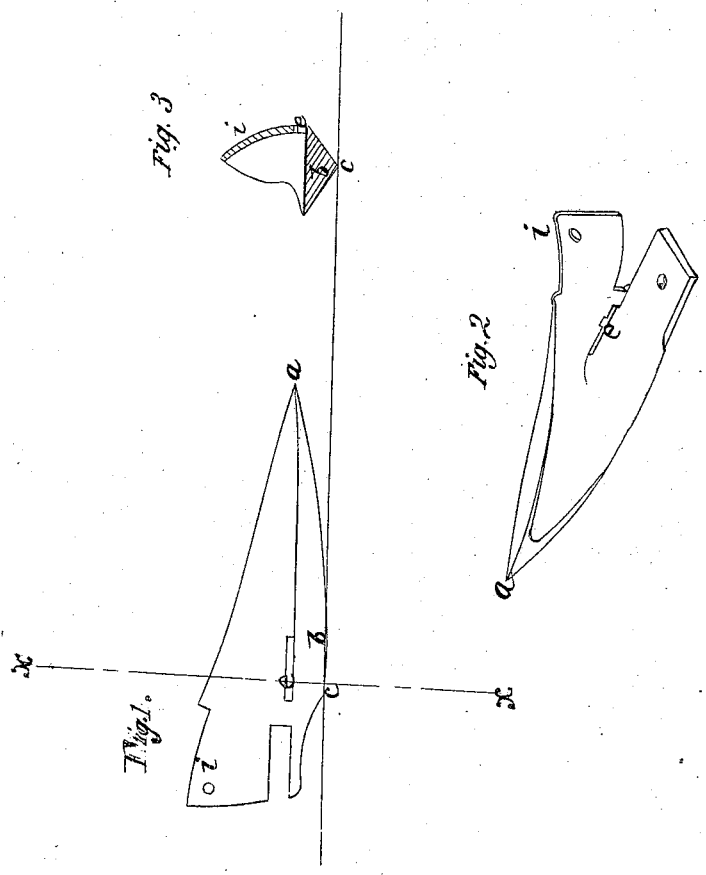

United States Patent Office.

WALTER A. WOOD, OF HOOSICK FALLS, NEW YORK.

IMPROVED DIVIDING-SHOE FOR MOWING-MACHINES.

Specification forming part of Letters Patent No. 15,203, dated June 24, 1856

*To all whom it may concern:*

Be it known that I, WALTER A. WOOD, of Hoosick Falls, in the county of Rensselaer and State of New York, have invented certain new and useful Improvements in the Construction of the Dividing-Shoe of Mowing-Machines; and I do hereby declare the following to be a full, clear, and exact description thereof, reference being had to the accompanying drawings, making a part thereof, in which—

Figure 1 represents a side view of the shoe. Fig. 2 represents a perspective view thereof. Fig. 3 represents a vertical transverse section taken through the red line $x$ $x$ of Fig. 1.

Similar letters where they occur in the drawings denote like parts in all.

The object of my invention is to so divide the grass to be cut from that which is to be left standing, as that there shall be no combing or ridging or bending down of the grass so as to prevent the cutters from taking it, but so that a perfectly smooth mowed surface shall appear, without showing the swaths of the machine. This is effected by the peculiar shape of the dividing-shoe, as will be hereinafter explained.

To enable others skilled in the art to make and use my invention, I will proceed to describe the same with reference to the drawings.

The shoe is cast hollow for the sake of lightness, and its several lines terminate in front in a point, $a$, which point, when the shoe is attached to the mowing-machine, moves at a slight distance above the sod. The under part of the shoe $b$, Fig. 3, is of triangular form, and the obtuse angle thereof $c$ is the portion of the shoe which runs upon the ground. A line drawn from $c$ to the point $a$ would make a curved line, which, in its vertical plane, would be at right angles, or nearly so, with the cutter-bar, which passes through the mortise $e$ of the shoe. The point $a$ of the shoe divides the grass that is to be cut from that which is to be left standing, that which is to be cut being bent over by the shield portion $i$ in proper position to be reached and severed by the sickle. That which is to be left standing is as gently bent over the other way, but in no way broken or crushed down, as is the case where either a flat or rounded bearing is made on the under side of the shoe. There is no "riding down" of the grass by my divider or dividing-shoe, and consequently the sickle must reach everything above its regulated height, and leave no combing or ridging. My shoe may be said to divide the grass at the ground, and thus reaches the finest kinds of grass, and its line of impact with the ground from point to rear is in a line at right angles with the finger-bar and directly through the center of the shoe.

Having thus fully described the nature of my invention, what I claim therein as new, and desire to secure by Letters Patent, is—

The particular form and construction of a dividing-shoe for mowing-machines, as above described, by means of which the grass on either side of it is divided and bent over without breaking or crushing, so that the sickle will reach it all, and thus prevent combing or ridging, substantially as set forth.

WALTER A. WOOD.

Witnesses:
E. KIRKLAND,
F. H. FESSENDIN.